(12) United States Patent
Gray

(10) Patent No.: US 7,619,884 B1
(45) Date of Patent: Nov. 17, 2009

(54) PORTABLE STORAGE APPARATUS AND DOCKING STATION EMPLOYING A SOLAR ENERGY CHARGING SYSTEM FOR ELECTRONIC DEVICES

(76) Inventor: Randolph Gray, 16721 Chamonix Ter., Round Rock, TX (US) 78681

( * ) Notice: Subject to any disclaimer, the term of this patent is extended or adjusted under 35 U.S.C. 154(b) by 115 days.

(21) Appl. No.: 11/602,447

(22) Filed: Nov. 15, 2006

Related U.S. Application Data

(60) Provisional application No. 60/736,882, filed on Nov. 15, 2005.

(51) Int. Cl.
*H05K 5/00* (2006.01)
*G06F 1/16* (2006.01)
(52) U.S. Cl. .................................. 361/686; 136/251
(58) Field of Classification Search ............ 361/686; 136/251; 224/576
See application file for complete search history.

(56) References Cited

U.S. PATENT DOCUMENTS

| | | | |
|---|---|---|---|
| 5,522,943 A | 6/1996 | Spencer et al. | |
| 5,701,067 A | 12/1997 | Kaji et al. | |
| 5,855,692 A | 1/1999 | Kaji et al. | |
| 6,024,624 A | 2/2000 | Lee | |
| 6,184,654 B1 | 2/2001 | Bachner, III et al. | |
| 6,281,425 B1 | 8/2001 | Price | |
| 6,384,570 B2 | 5/2002 | Matsuyama | |
| 6,870,089 B1* | 3/2005 | Gray ........................... | 136/251 |
| 7,404,506 B1* | 7/2008 | Ross ........................... | 224/576 |
| 2002/0158602 A1 | 10/2002 | McNair, Jr. | |
| 2003/0072133 A1* | 4/2003 | Chuang ....................... | 361/686 |
| 2003/0232530 A1* | 12/2003 | Vista et al. ................... | 439/170 |
| 2005/0140331 A1* | 6/2005 | McQuade .................... | 320/101 |

FOREIGN PATENT DOCUMENTS

| | | |
|---|---|---|
| DE | 3314251 | 10/1984 |
| GB | 2402331 A * | 12/2004 |
| JP | 7-327725 | 12/1995 |
| JP | 9-18042 | 1/1997 |
| JP | 10-146213 | 6/1998 |
| JP | 11-299528 | 11/1999 |

OTHER PUBLICATIONS

Voltaic Solar/Electronic Backpack by Tree-Hugger on Sep. 28, 2004.*
Reactor Solar Computer Backpack (Item # 5085) No Date.*
Solardyne. "Solar Power Pack." Nov. 12, 2002 <http://www.solardyne.com/solpowpaccom.html>.
Sundance Solar Products, Inc. "Diogenes Personal Solar Power Pack." Nov. 12, 2002 <http://store.sundancesolar.com/diogpersolpo.html>.
ICP Global Technologies. "Product Info." Nov. 12, 2002 <http://www.isunpower.com/html/isun.htm>.

* cited by examiner

*Primary Examiner*—Hae Moon Hyeon
(74) *Attorney, Agent, or Firm*—Larson Newman & Abel, LLP

(57) ABSTRACT

A portable storage apparatus and docking station employing a solar energy charging system for electronic devices is provided. According to one aspect, a portable storage apparatus can include a docking station coupled to a portion of the portable storage apparatus. The portable storage apparatus can also include a docking interface coupled to the portable storage apparatus to secure the docking station to the portable storage apparatus. The portable storage apparatus can further include a power source operable to couple converted solar energy to the docking station. The power source can be operable to power an electronic device coupled to the docking station. The portable storage apparatus can also include an antenna operable to be coupled to the docking station, and the antenna can extend away from the docking interface.

18 Claims, 5 Drawing Sheets

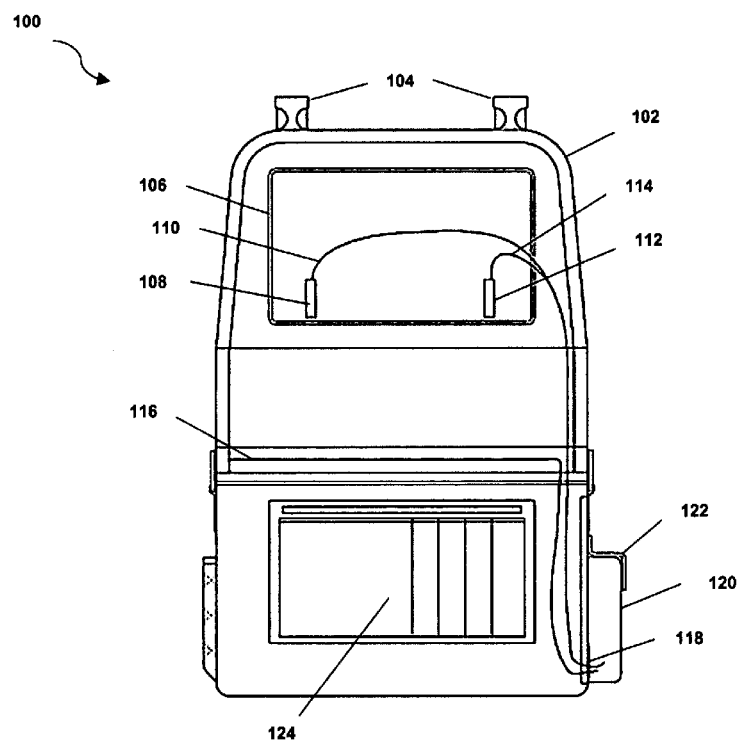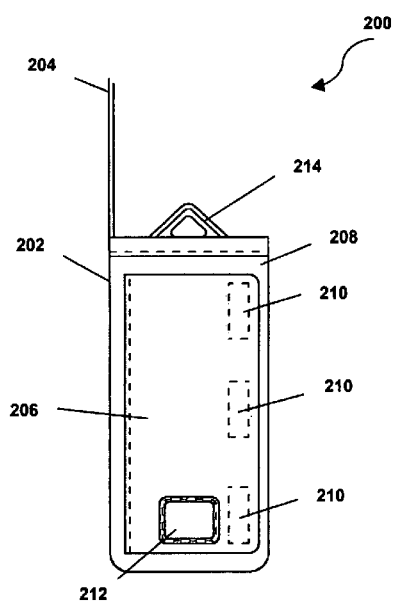
*FIG. 1*  *FIG. 2*

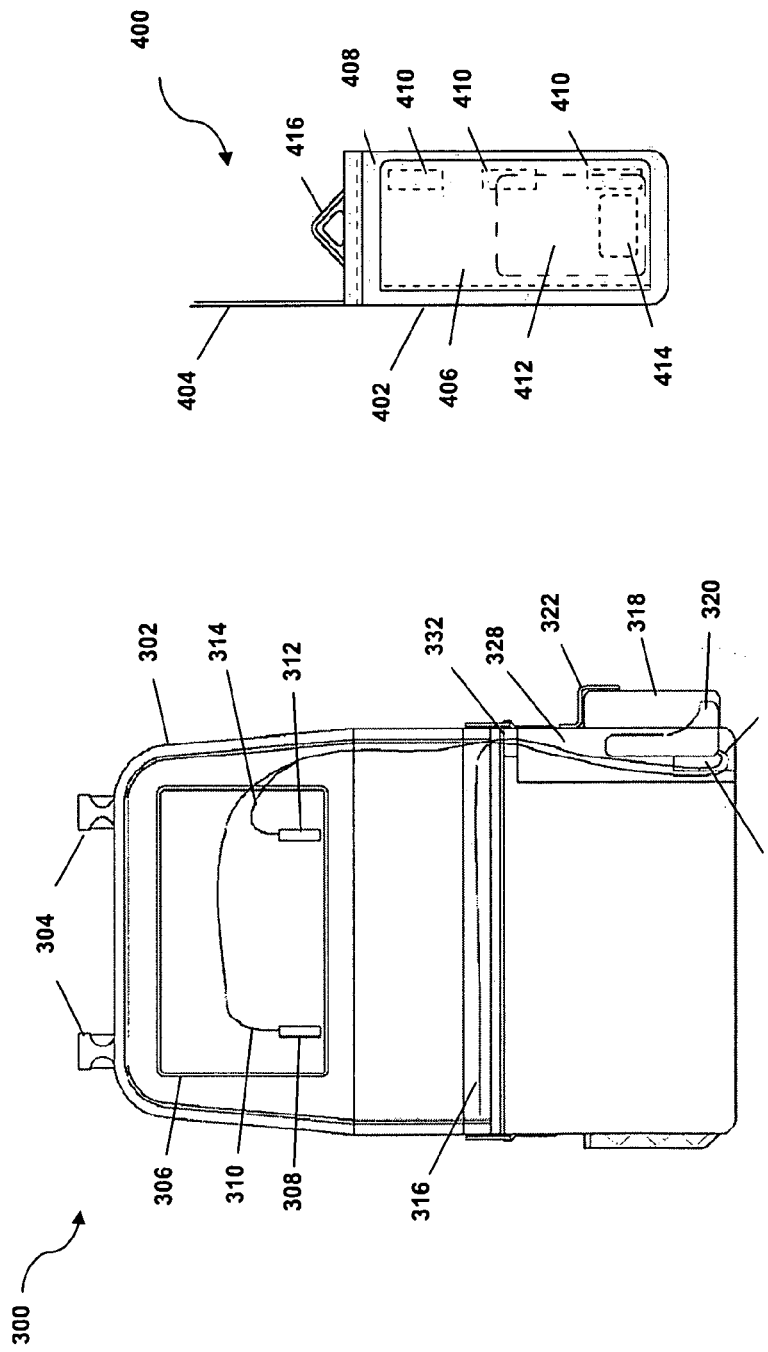

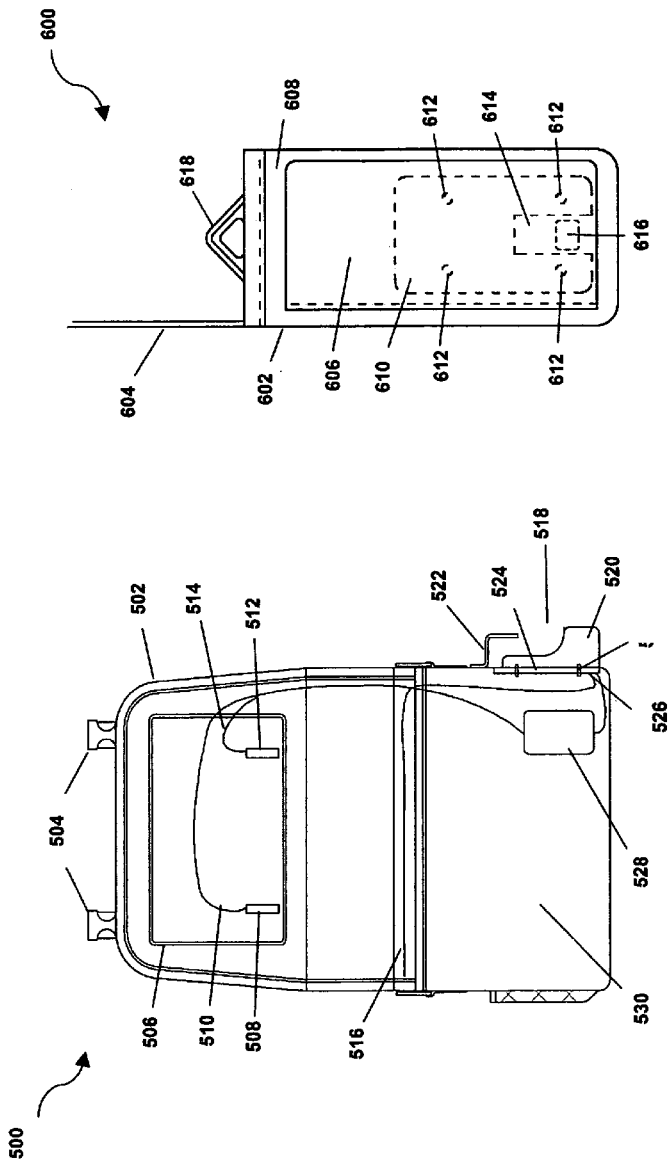

PORTABLE STORAGE APPARATUS AND DOCKING STATION EMPLOYING A SOLAR ENERGY CHARGING SYSTEM FOR ELECTRONIC DEVICES

CROSS REFERENCE TO RELATED APPLICATION

This application claims priority to United States Provisional Patent Application entitled "Satellite Radio Enabled Portable Storage Apparatus And Solar Energy Charging System" having application Ser. No. 60/736,882 and filed on Nov. 15, 2005 and herein incorporated by reference.

FIELD OF THE DISCLOSURE

This disclosure relates generally to charge systems, and more particularly to a portable storage apparatus and docking station employing a solar energy charge system for electronic devices.

BACKGROUND

Power utilization of conventional hand-held electronic devices vary significantly depending on the application and utilization of a device. Some electronic devices include reduced power states that draw very little power when the electronic device is not in use. For example, a handheld computing device may use significantly more energy to process user inputs and display information within user interfaces such as thin film transistor active matrix displays (TFT displays). When the handheld computing device is not being used, it is placed in an off mode, sleep mode or other reduced power state to decrease or reduce power consumption.

Other electronic devices, such as some conventional cellular telephones, consume energy based on a user's interaction with a wireless network. For example, some conventional cellular telephones include off positions, standby modes for receiving phone calls or other incoming data services, and active mode for interacting with wireless networks to place and receive phone calls or requesting data services. Each mode of operation may have separate power demands or requirements.

Advancements in wireless networks may also increase power utilization of some electronic devices. For example, as cellular phones and handheld computing devices migrate to high speed wireless networks, power consumption of electronic devices may increase as a function of communicating and processing data via high-speed communication networks. This may result in more frequent charging of electronic devices.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 1 illustrates a portable storage apparatus including an electronics mount and docking interface according to one aspect of the disclosure;

FIG. 2 illustrates a electronics mount and docking interface operable to provide access to resources of a portable storage apparatus according to one aspect of the disclosure;

FIG. 3 illustrates a portable storage apparatus and an internally accessible docking station according to another aspect of the disclosure;

FIG. 4 illustrates an electronics mount and docking interface operable to secure a docking station according to one aspect of the disclosure;

FIG. 5 illustrates a portable storage apparatus including an externally accessible docking station according to one aspect of the disclosure;

FIG. 6 illustrates an electronics mount and docking interface operable to secure a docking station external to a portable storage apparatus according to one aspect of the disclosure;

The use of the same reference symbols in different drawings indicates similar or identical items.

DETAILED DESCRIPTION OF DRAWINGS

Figure 7:
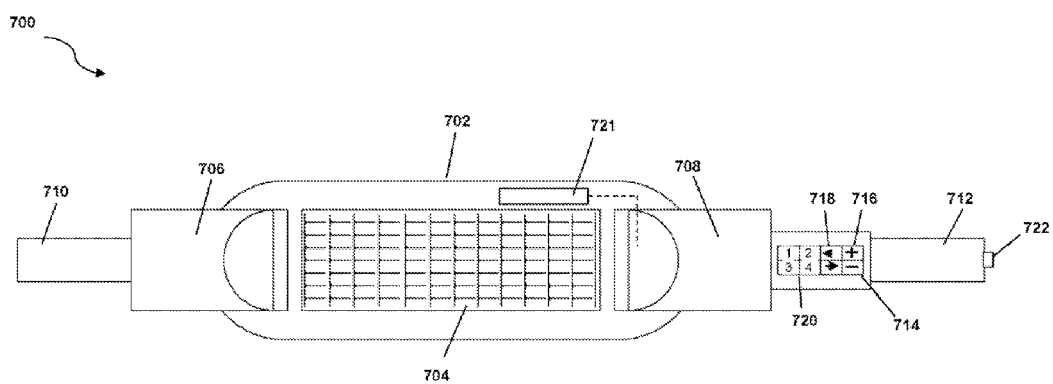
FIG. 7 illustrates a shoulder strap including an electronics mount and solar panel according to one aspect of the disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As indicated above, the following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

According to one aspect of the disclosure, a portable storage apparatus can include a docking station operable to be coupled to an electronic device. The portable storage apparatus can also include a docking interface operable to secure the docking station to a housing of a portable storage apparatus. The portable storage apparatus can also include an access port operable to provide access to a resource generated by the portable storage apparatus and used by the electronic device.

According to another aspect of the disclosure, an electronics mount of a portable storage apparatus is provided. The electronics mount can include a docking station operable to support a portion of an electronic device. The docking station can be operable to couple a resource generated by the portable storage apparatus to the electronic device. The electronics mount can also include a docking interface operable to secure a portion of the docking station to the portable storage apparatus. The docking interface can be aligned with an access panel of the portable storage apparatus to access the resource of the portable storage apparatus.

According to a further aspect of the disclosure, a portable storage apparatus can include a docking station coupled to a portion of the portable storage apparatus. The portable storage apparatus can also include a docking interface coupled to the portable storage apparatus to secure the docking station to the portable storage apparatus. The portable storage apparatus can further include a power source operable to couple converted solar energy to the docking station. The power source can be operable to power an electronic device coupled to the docking station. The portable storage apparatus can also include an antenna operable to be coupled to the docking station, and the antenna can extend away from the docking interface.

A portable storage apparatus can include various types of storage apparatuses including, but not limited to a backpack, a duffle bag, a saddle bag for a motorcycle or motorized bike, a camera bag, a 'fanny bag', a cooler, a carry case, or any other type of apparatus that may incorporate all or any portion of the features disclosed herein. As such, it should be understood that the features and functions should not be limited to a single type of portable storage apparatus and could be used in association with a variety of portable storage apparatuses as desired.

FIG. 1 illustrates a portable storage apparatus, generally depicted as a backpack 100, that can include a housing 102 and straps 104 for carrying the backpack 100. The backpack 100 can further include a solar energy conversion device such as a solar panel 106 including a first terminal 108 coupled to a first conductor 110. The solar panel 106 can include one or more flexible solar panels, rigid solar panels, or any combination thereof, integrated as a part of the backpack 100 and operable to convert solar energy into direct current power. The solar panel 106 can also include a second terminal 112 coupled to a second conductor 114. The first terminal 108 can include a positive terminal and the second terminal 112 can include a negative terminal.

The backpack 100 can further include an antenna 116 coupled along a portion of housing 102. In one form, the antenna 116 can be provided internal to a lining of the backpack 100 and can be maintained out of plain view however in other embodiments, all or portions of the antenna 116 can be provided external to the backpack 100. In one form, wiring or cabling provided in association with the first conductor 110, the second conductor 114, the antenna 116, or and combination thereof, can be placed between two layers of materials (not illustrated) of the backpack 100 to reduce accidental damage during use.

In one form, the antenna 116, the first conductor 110, and the second conductor 114 can be coupled to a docking interface 118 operably associated with an electronics mount 120. Wiring or cabling for the antenna 116, the first conductor 110, and the second conductor 114 can extend away from the docking interface 118. The electronics mount 120 can include pocket or other cavity of the backpack that can be used to store an electronic while providing vertical support of the electronic device. The electronics mount 120 can be formed from the same or similar material as the body 102 of the backpack 100. For example, materials such as a cloth materials such canvas, polyester blends, plastic materials or any other type of material that can be used to form the body 102. In one form, the electronics mount 120 can be formed as a pocket along a side portion or rear of the backpack 100 and can be opened and closed as needed to mount an electronic device.

In one form, the electronics mount 120 can also include a horizontal support mount 122 operable to secure an electronic device in a horizontal direction. In one form, the horizontal support mount 122 can include a bracket formed form metal such as aluminum or other alloys, plastic, rubber, or any other type of material, or combinations of materials that can be used for horizontal support. The horizontal support mount 122 can be used to ensure an electronic device (not illustrated) does not fall out of the electronics mount 120 or become dislodged as the backpack 100 is being used. In one form, the horizontal support mount 122 can be formed from a hook and loop material, such as Velcro®, and placed along a side portion of the backpack 100. An electronic device can further include a comparable hook and loop material along a housing of the electronic device. As such, the electronic device can be secured to a portion of the backpack 100 as desired.

The electronics mount 120 can be employed to mount various types of electronic devices including, but not limited to digital media storage devices, and music players, satellite radios, a local broadcast radio receivers, cellular communication devices, cell phones, personal digital assistants, digital cameras, Ipod® music players, picture players, or video players, or other any other type of music or video player, or any other types of electronic device, or combinations of electronic devices, that may benefit from accessing resources of the backpack 100 when mounted to electronics mount 120.

During use, a user can mount an electronic device to electronics mount 120 and the docking interface 118 can be used to access resources associated with the backpack 100. For example, the docking interface 118 can include one or more plugs, cable connectors, terminals, interfaces, or any combination thereof, that can be coupled to the electronic device. For example, a power connector can be sized for a specific electronic device. However, in other embodiments, a plug or connector adapter can be used to couple the electronic device to resources of the backpack 100. For example, a standardized interface such as an IGO® interface manufactured by Mobility Electronics, Inc. can be used with various types of removable interface tips that can be removed and replaced as needed for a specific type of electronic device. In one form, the docking interface 118 can include separate connectors for separate resources that can be provided by the backpack 100. However, in other embodiments, a single connector can be used to provide access to the resources of the backpack 100. According to one aspect, various interface converters can be used depending on the type of electronic device desired to be employed.

According to one aspect, the antenna 116 can include a radio antenna operable to receive AM radio signal, FM radio signals, satellite radio signals, or any combination thereof. In another form, the antenna 116 can be realized as multiple antennas operable to receive separate radio signals and couple the radio signals to an electronic device. In one embodiment, a portable satellite radio (not illustrated), such as XM® satellite radios, Sirrus® satellite radios, and the like, can be coupled to the electronics mount 120. Additionally, the antenna 116 can be operable as a satellite radio antenna and coupled to the portable satellite radio. The portable satellite radio can also be coupled to the solar panel 106. In this manner, resources of the backpack 100 such as converted solar energy and satellite radio signals produced by the backpack 120 can be coupled to a portable satellite radio mounted to electronics mount 120, thereby allowing a user to the portable satellite radio in portable environments. Additionally, the electronics mount 120 can be used to couple an electronic device to resources and in one form, obviates the need to used docking station for coupling resources of the backpack 100 to an electronic device.

In one form, the docking interface 118 and horizontal mount 122 can be provided external to the backpack 100. For example, an electronic device can be secured to the docking interface 118 and the horizontal mount 122 can apply a pressure to an electronic device when engaged to docking interface 118 and horizontal mount 122. In this manner, a user can have access to controls of the electronic device when mounted to docking interface 118 and horizontal mount 122.

FIG. 2 illustrates an electronics mount, generally depicted at 200, and operable to provide access to resources of a portable storage apparatus. In one form, the electronics mount 200 can be used in association with the backpack 100 illustrated in FIG. 1. The electronics mount 200 can include a main pocket 202 coupled along a portion of a housing 204 of a portable storage apparatus. The electronics mount 200 can include front access panel 206 that can be coupled to a front portion 208 of the electronics mount 200. The front access panel 206 can include a hook and loop material 210 such as Velcro® or other type of material to secure the front access panel 206 to the front portion 208. The electronics mount 200 can further include a rear access panel 212 that can be rotated up or down, or side-to-side, or any combination thereof, to provide access to resources available from a portable storage apparatus. A strap connector 214 can be coupled to a portion of the electronics mount 214 for securing one or more straps of a portable storage apparatus.

During use, an electronic device can be placed within the electronics mount 200 and the rear access panel 212 can be opened to access one or more resource of the portable storage apparatus. In one form, the rear access panel 212 can provide access to a main body portion of the portable storage apparatus, and one or more connectors can be coupled to the electronic device place within the electronics mount 200. In another form, the rear access panel 212 can include one or more connectors coupled to the rear access panel 212 and operable to couple an electronic device to resources. Upon a user coupling the electronic device, a user can close front access panel 206 to secure the electronic device within the electronics mount 200.

FIG. 3 illustrates a portable storage apparatus, depicted generally as backpack 300. The backpack 300 can include a housing 302 and straps 304 for carrying the backpack 300. The backpack 300 can further include a solar energy conversion device or solar panel 306 including a first terminal 308 coupled to a first conductor 310. The solar panel 306 can include one or more flexible solar panels, rigid solar panels, or any combination thereof, integrated as a part of the backpack 300 and operable to convert solar energy into direct current power. The solar panel 306 can also include a second terminal 312 coupled to a second conductor 314.

The backpack 300 can also include an antenna 316 coupled along a portion of the housing 302. In one form, the antenna 316 can be provided internal to a lining of the backpack 300 and can be maintained out of plain view. However, in other embodiments, portions or all of the antenna 316 can be provided external to the backpack 300. Wiring or cabling provided in association with the first conductor 310, the second conductor 314, the antenna 316, or and combination thereof, can be placed between two layers of materials (not illustrated) of the backpack 300 to avoid accidental damage during use.

The backpack 300 can also include a electronics mount 318 including a docking station 320 operable to provide vertical support of an electronic device when placed within the docking station 320. The electronics mount 318 can further include a horizontal mount 322 operable to secure an electronic device in a horizontal direction. The electronics mount 318 further includes docking interface 324 operable to provide access to resources 326 of the backpack 300. The backpack 300 further includes a cavity 328 for isolating the electronics mount 320. The cavity can include one or more conduits 332 for routing resources of the backpack 300 to the docking station 300. During operation, a user can access the electronics mount 318 and place an electronic device within the docking station 320. The docking station 320 can couple resources of the backpack 300 to the electronic device using docking interface 326 having one or more connectors, plugs, interfaces, etc. operable to be coupled to the docking station 320. In one form, the resources can be directly connected to the docking interface 320 as desired.

FIG. 4 illustrates an electronics mount 400 that can be provided in association with a portable storage apparatus. In one form, the electronics mount 400 can include the docking station 320 illustrated in FIG. 3 and provided in association with the backpack 300 illustrated in FIG. 3. The electronics mount 400 can include a main pocket 402 that can be provided along a portion of a housing 404 of a portable storage apparatus. The electronics mount 400 can include front access panel 406 that can be coupled to a front portion 408 of the electronics mount 400 using a hook and loop material 410 such as Velcro® or other type of material. The electronics mount 400 can further include a docking station 412 such as a docking cradle or other type of docking device, operable to dock an electronic device and provide access to resources. In one form, the docking station 412 can include a mounting plate coupled to a rear portion of the electronics mount 400 and operable to provide reinforcement and stability. The docking station 412 can further include a docking interface 414 such as a plug, connector, or other form of coupler that can be used to access and couple resources of a portable storage apparatus to an electronic device when placed within the docking region 412. For example, the docking interface 414 can couple resources, such as power, an antenna, input controls for controlling the electronic device, etc. using a connector or other interface that can be coupled to the docking station 412. For example, the docking interface 414 can route the appropriate resources for an electronic device to a specific input port of the electronic device to provide resources to an electronic device mounted within the docking station 412.

FIG. 5 illustrates a portable storage apparatus, depicted generally as a backpack 500. The backpack 500 can include a housing 502 and straps 504 for carrying the backpack 500. The backpack 500 can further include a solar energy conversion device or solar panel 506 including a first terminal 508 coupled to a first conductor 510. The solar panel 506 can include one or more flexible solar panels, rigid solar panels, or any combination thereof, integrated as a part of the backpack 500 and operable to convert solar energy into direct current power. The solar panel 506 can also include a second terminal 512 coupled to a second conductor 514.

The backpack 500 can also include an antenna 516 coupled along a portion of housing 502. In one form, the antenna 516 can be provided internal to a lining of the backpack 500 and can be maintained out of plain view. In other embodiments, all or portions of the antenna 516 can be provided external to the backpack 500. Wiring or cabling provided in association with the first conductor 510, the second conductor 514, the antenna 516, or and combination thereof, can be placed between two layers of materials (not illustrated) of the backpack 500 to avoid accidental damage during use.

The backpack 500 can also include an electronics mount 518 including a docking station 520 operable to provide vertical support of an electronic device when placed within the docking station 520. The electronics mount 518 can further include a horizontal mount 522 operable to secure an electronic device in a horizontal direction. The electronics mount 518 can further include docking interface 524 operable to provide access to resources 526 of the backpack 500. The backpack 500 can further include a rechargeable battery 528 stored within a housing 530 and coupled to the solar panel 506 and operable to store converted solar energy. Though not illustrated, cabling for the solar panel 506, the antenna 516, the rechargeable battery 528, controls, or other resources can be provided within one or more conduits and routed to the docking interface 524.

During operation, a user can access the electronics mount 518 and place an electronic device within the docking station 520. The docking station 520 can couple resources of the backpack 500 to the electronic device using docking interface 526 having one or more connectors, plugs, interfaces, etc. operable to be coupled to the docking station 520. The docking interface 526 can also be coupled to the docking station 520 using mounting screws 532 or another forms of mounting mechanisms. In one form, the resources can be directly connected to the docking interface 520 as desired. The electronics mount 518 can be provided external to the backpack 500 to allow a user to access an electronic device without having to open the backpack 500.

The rechargeable battery 528 can be coupled to the solar panel 506 and the docking interface 526. The rechargeable battery 528 can store converted solar energy provided by the solar panel 506. The rechargeable battery 528 also can be used to couple stored energy to the docking interface 526 when an electronic device may be coupled to the docking station 520. In other embodiments, the solar panel 506 and the rechargeable battery 528 can be coupled to the docking interface 526 to provide power to the electronic device. When an electronic device may not be coupled to the docking station 520, the solar panel 506 can recharge the rechargeable batteries 528 as desired.

In some forms, some electronic devices may not require the use of an external antenna. As such, the antenna 516 may not be needed and can be disconnected from the docking interface 526 as desired. For example, an electronic device mounted external to the backpack can allow the electronic device having an internal antenna to receive signals without the use of the antenna 516. According to another aspect, one or more of the shoulder straps 504 can include the antenna 516.

FIG. 6 illustrates an electronics mount 600 that can be provided in association with a portable storage apparatus. In one form, the electronics mount 600 can include the electronics mount 518 illustrated in FIG. 5 and provided in association with the backpack 500 illustrated in FIG. 5. The electronics mount 600 can include a mounting region 602 that can be provided along a portion of a housing 604 of a portable storage apparatus. The electronics mount 600 can include a docking cavity 606 along a front portion 608 of the electronics mount 600.

The electronics mount 600 can further include a docking interface 610 that can be used to mount a docking station or other type of docking device to the housing 604 of a portable storage apparatus. In one form, the docking interface 610 can include a metal or plastic plate integrated (not illustrated) as a part of the housing 604 to provide reinforcement and stability. In one form, the docking interface 610 can include mounting screws 612 or other form of mounting hardware that can be used to mount a docking station or other docking device to electronics mount 600. The docking interface 610 can also include a slot 614 that can provide access to a one or more resources of a portable storage device. For example, the slot 614 can provide access to a connector or cable 616 or other form of interface that can be used to access and couple resources of a portable storage apparatus to an electronic device when placed within the electronics mount 600.

FIG. 7 illustrates a shoulder strap, generally depicted at 700. The shoulder strap 700 can include a main body 702 including a solar panel 704 such as a flexible or rigid solar panel, provided along an external portion of the main body 702. The shoulder strap 700 can further include a first electronics mount or first pocket 706 and a second pocket 708 operable to store an electronic device. The shoulder strap 700 further includes a first end 710 and a second end 712 operable to be coupled to a portable storage apparatus. in one form, the shoulder strap 700 can be detached from a portable storage apparatus and used independently.

The shoulder strap 700 can further include a controller 714 operable to control an electronic device stored within the shoulder strap 700 or a portable storage apparatus. The controller 714 can be include soft button controls and can include volume controls 716, a station controls or song controls 718, and one or more preset button 720 to access a playlist or specific media station. In one form, an electronic device can be stored within first pocket 706 or second pocket 708 and can access resources of the shoulder strap 700. For example, converted solar energy can be coupled to the electronic device. In another form, the shoulder strap 700 can include an antenna 721. According to another aspect, the electronic device can also access the controller 714 and a user can control the electronic device when coupled to the shoulder strap 700. In one form, the shoulder strap 700 can be coupled to a portable storage apparatus and one or more of the resources of the shoulder strap 700 can be coupled to the portable storage apparatus using a connector 722. For example, the connector 722 can be coupled to a port or other coupler operable to receive the connector 722. In one form, the connector 722 can be provided as a USB connector, or other link connector, and can provide resources of the shoulder strap 700 to the portable storage apparatus operable to be coupled to the connector 722. For example, an electronic device can be placed within an electronic mount, such as the electronic mount 518 of the backpack 500 illustrated in FIG. 5. The electronic device can then access the resources of the shoulder strap 700 as desired. For example, a user can use controller 714 to control the electronic device mounted within the electronic mount 500. In other forms, the solar panel 704 can be used to charge the rechargeable battery 528 or provide power as needed to the electronic device mounted within the electronic mount 518.

In one form, the first pocket or the second pocket, or any combination thereof, can include an multimedia interface allowing for coupling of converted solar energy, satellite radio antenna signals, remote control signals, etc. to an electronic device stored within. For example a standardized plug, such as a USB plug or other type of link interface can be provided within one or both of the first pocket 706 and the second pocket 708. In one form, one or more attachments may be coupled to the standardized plug to allow for coupling to a specific type of electronic device According to one aspect, one or both of the first pocket 706 or second pocket 708 can include several mounts and associated indicia for mounting various tips or ports for charging multiple types of devices. In one form, a user may couple the specific tip to the universal interface to charge a specific device as needed. In this manner, multiple tips may be stored within the accessory pocket and charge an specific type of device as needed. In one embodiment, a rechargeable battery (not illustrated) can be provided within a second pocket may include a battery pack for charging rechargeable batteries using converted solar energy as desired.

In one embodiment, a splitter (not illustrated) can be provided to allow for coupling converted solar energy to multiple charge ports to allow for charging multiple electronic devices. For example, a converted solar energy may be accessible using the first pocket 706 and a may also be coupled to an electronic device stored within a portable storage device. In another embodiment, the shoulder strap 700 can be removable and may be used independent of a portable storage apparatus. Additionally, the shoulder strap 700 can include an interface to allow for coupling to the portable storage apparatus to provide an additional solar panel that may be used in addition to the solar panel 700. For example, a portable storage apparatus such as backpack 300 can couple energy from the backpack 300 to the shoulder strap 700 and an associated battery or device coupled within one or more of the first pocket 706 or second pocket 708.

In another embodiment, the shoulder strap 700 can include an interface to allow for coupling of a satellite radio antenna 721 to a portable satellite radio. For example, a satellite antenna can be provided as a part of the shoulder strap 700 and an interface may be provided within the first pocket 700 of the shoulder strap for coupling the satellite radio. However, in another embodiment, the shoulder strap 700 can include an interface for coupling a satellite antenna of a portable storage apparatus or an external satellite antenna to the shoulder strap 700.

Figure 8:
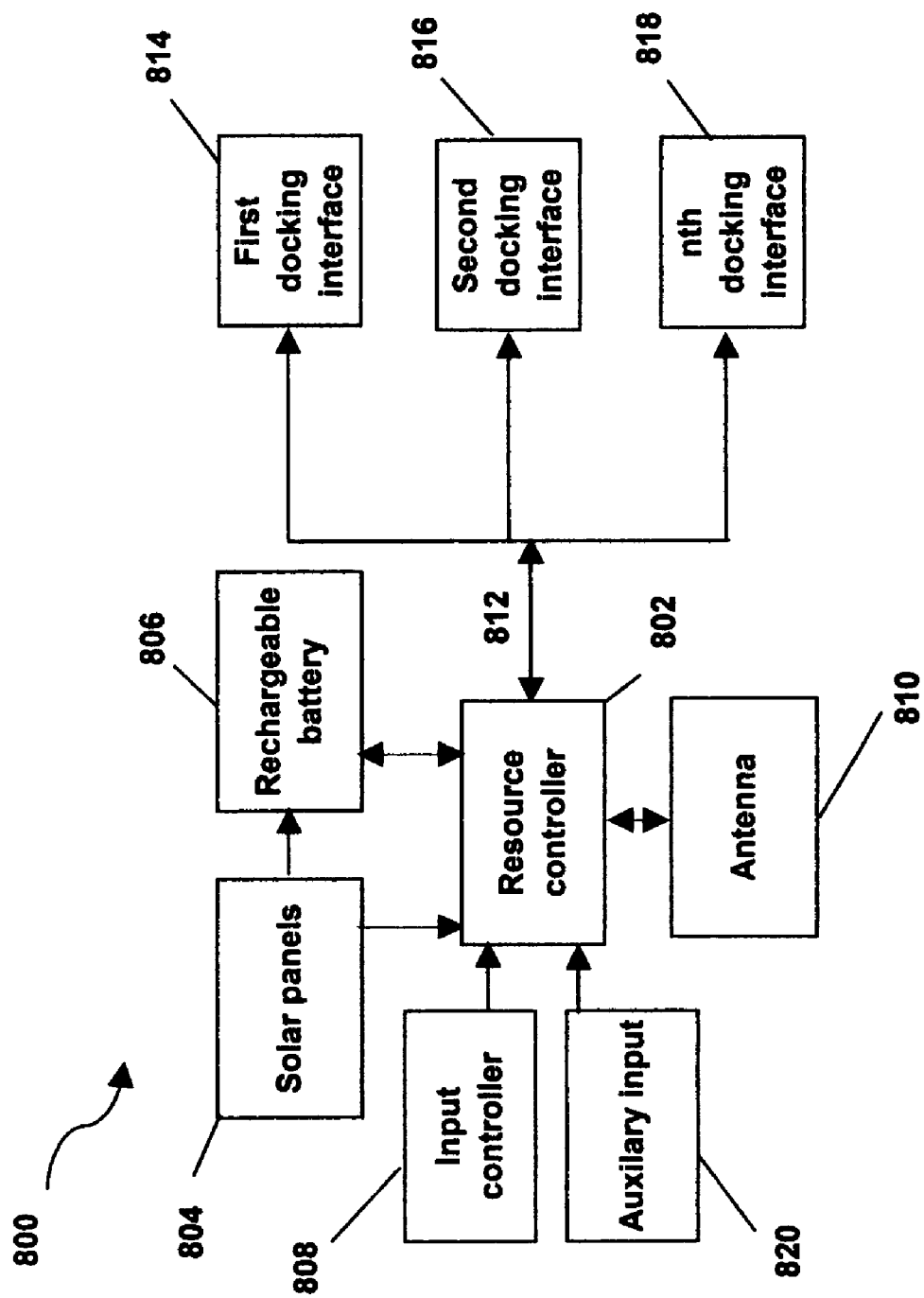
FIG. 8 illustrates a system diagram of providing resources of portable storage apparatus to docking interface according to one aspect of the disclosure.

FIG. 8 illustrates a resource system 800, operable to couple resources of portable storage apparatus to one or more docking interfaces according to one aspect of the disclosure. The resource system 800 can be used in association with the backpack 100 illustrated in FIG. 1, the backpack 300 illustrated in FIG. 3, the backpack 500 illustrated in FIG. 5, the shoulder strap 700 illustrated in FIG. 7, or any other type of device or system that can employ one or more of the features of the resource system 800.

The resource system 800 can include a resource controller 802 that can be coupled to one or more resources such as one or more solar panels 804, a rechargeable battery 806, an input controller 808, one or more antenna 810, and auxiliary input 820 or any other type of input that can provide a resource operable to be coupled to one or more of a first docking interface 814, a second docking interface 816, or an $n^{th}$ docking interface 818. Resource controller 802 can be coupled to one or more docking interface using output 812. In one form, output 812 can include several outputs directly connected to each docking interface. However, in other forms, output 812 can include a bus or lining technology operable to couple the resource controller 802 to a docking interface. In one embodiment, USB enabled coupling can be used to connect one or more of the interfaces to the resource controller 802. According to another aspect, the auxiliary input 820 can include a USB enabled input operable to coupled one or more USB enabled resources to the resource controller 812. For example, the shoulder strap 700 can include a USB port operable to be coupled to the resource controller 802 and provide additional resources, such as a controller, converted solar energy, antenna signals, music or video outputs, or various other outputs that can be provided. In one form, the auxiliary port can be a bi-directional port to allow for coupling resources using the resource controller 802 to a device coupled to the auxiliary input 820.

During operation, the resource system 800 can be used to provide one or more resources to a docking interface coupled to the resource controller 802. For example, a first electronic device can be coupled to the first docking interface 814 and can include a resource profile or requirement that can be determined by the resource controller 802. For example, the first device coupled to the first docking interface 814 may utilize converted solar energy and an input controls. As such, the resource controller 802 can enable the input controller 808, the solar panels 804, and the rechargeable battery 806, and couple the resources to the first docking interface 814. In another embodiment, a second device can be coupled to the second docking interface 816 and may employ the solar panels 804, the rechargeable battery 806, and one or more antennas 810. As such, the resource controller 802 can couple the desired resource to the second docking interface 816. In another embodiment, an additional solar panel may be coupled to the auxiliary input 820. As such, the resource controller 802 can couple the additional solar panel to a docking interface, if desired, or to the rechargeable battery to recharge the rechargeable battery 806.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A portable storage apparatus comprising:
   a docking station operable to support an electronic device, and the docking station comprising a docking interface operable to engage the electronic device and operable to provide a resource generated by the portable storage apparatus to the electronic device for use by the electronic device;
   an antenna operable to provide a wireless communication signal as a portion of the resource; and
   a power source operable to provide converted solar energy to the electronic device as a portion the resource, the converted solar energy to power the electronic device.

2. The portable storage apparatus of claim 1, wherein the antenna extends away from the docking interface and along a lining of a housing of the portable storage apparatus.

3. The portable storage apparatus of claim 1, wherein the antenna extends along a portion of a shoulder strap of the portable storage apparatus.

4. The portable storage apparatus of claim 1, wherein the antenna is a satellite radio antenna.

5. The portable storage apparatus of claim 1 further comprising: an input controller operable to provide input control information as the resource, wherein the input control information is operable to control a portion of the electronic device.

6. The portable storage apparatus of claim 5, wherein the input controller is located along a shoulder strap of the portable storage apparatus.

7. The portable storage apparatus of claim 1, further comprising:
   a solar panel integrated as part of the portable storage apparatus, the solar panel provided along an exterior portion of a housing of the portable storage apparatus.

8. The portable storage apparatus of claim 7, further comprising:
   a rechargeable battery coupled to the solar panel operable to store the converted solar energy prior to being provided to the electronic device as the resource.

9. The portable storage apparatus of claim 1, further comprising the electronic device accessible along an exterior portion of the housing when supported by the docking station.

10. The portable storage apparatus of claim 1, further comprising the electronic device accessible along an interior portion of a housing of the portable storage apparatus when supported by the docking station.

11. The portable storage apparatus of claim 1, wherein the docking interface is aligned with an access panel of the portable storage apparatus to access the resource of the portable storage apparatus.

12. The storage apparatus of claim 11, further comprising the electronic device accessible along an exterior of the portable storage apparatus when placed within the docking station.

13. The storage apparatus of claim 11, further comprising the electronic device accessible along an interior of the portable storage apparatus when placed within the docking station.

14. The storage apparatus of claim 1, wherein the docking station is operable to provide vertical support of the electronic device, and the storage apparatus further comprising a horizontal support mount operable to provide horizontal support of the electronic device.

15. The storage apparatus of claim 14 further comprising:
- a mounting plate coupled to the docking station and to a housing of the portable storage apparatus; and
- the horizontal support mount includes a mounting bracket operable to extend over a portion of the electronic device when mounted within the docking station.

16. The portable storage apparatus of claim 1 is a backpack including a pocket, the pocket including the docking station.

17. The portable storage apparatus of claim 1 further comprising a pocket, the pocket including the docking station.

18. A portable storage apparatus comprising:
- a docking station operable to support an electronic device, and the docking station comprising a docking interface operable to engage the electronic device and operable to provide a resource generated by the portable storage apparatus to the electronic device for use by the electronic device; and
- a shoulder strap including:
  - a solar panel operable to convert solar energy to electrical energy;
  - an input power port operable to couple converted solar energy of the solar panel to a second electronic device; and
  - an output power port operable to couple the converted solar energy to the docking station as the resource.

* * * * *